Sept. 10, 1957  H. NERWIN  2,805,609
PHOTOGRAPHIC CAMERA AND OBJECTIVE MOUNTS THEREFOR
Filed March 28, 1952  4 Sheets-Sheet 2
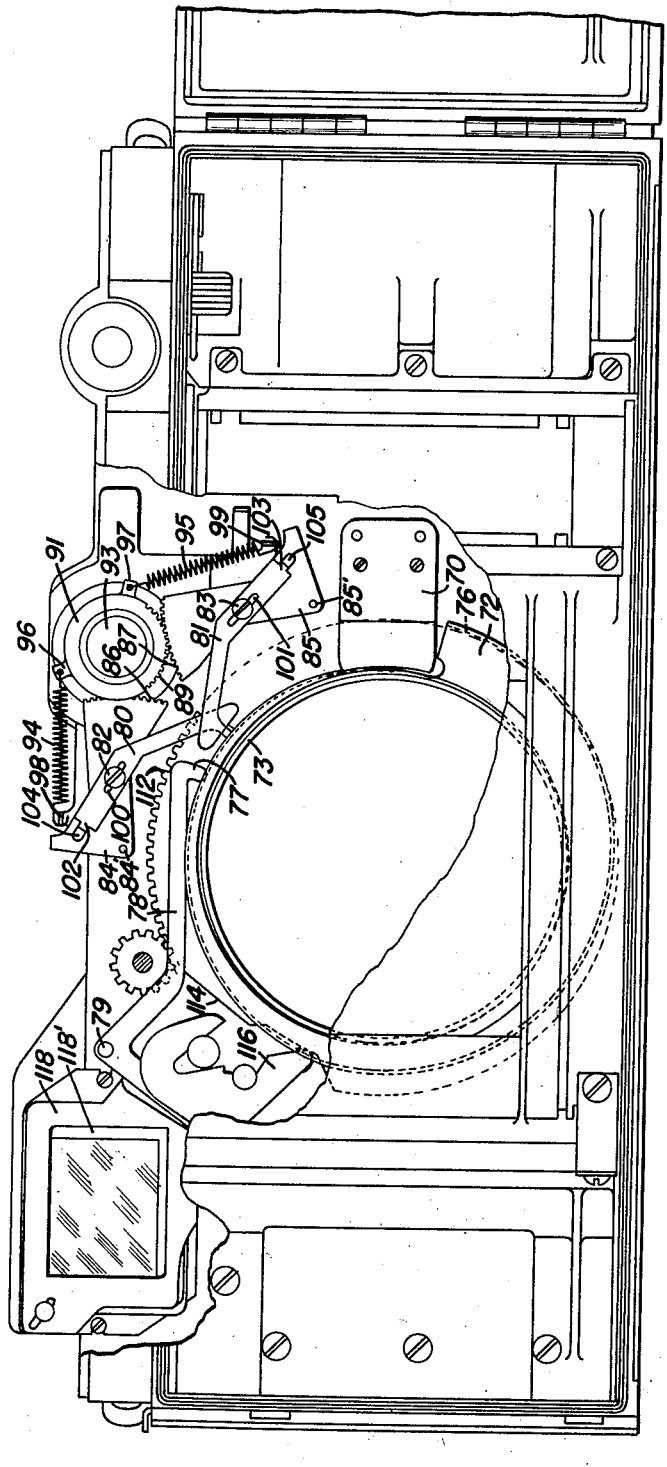
INVENTOR.
HUBERT NERWIN
BY
ATTORNEY

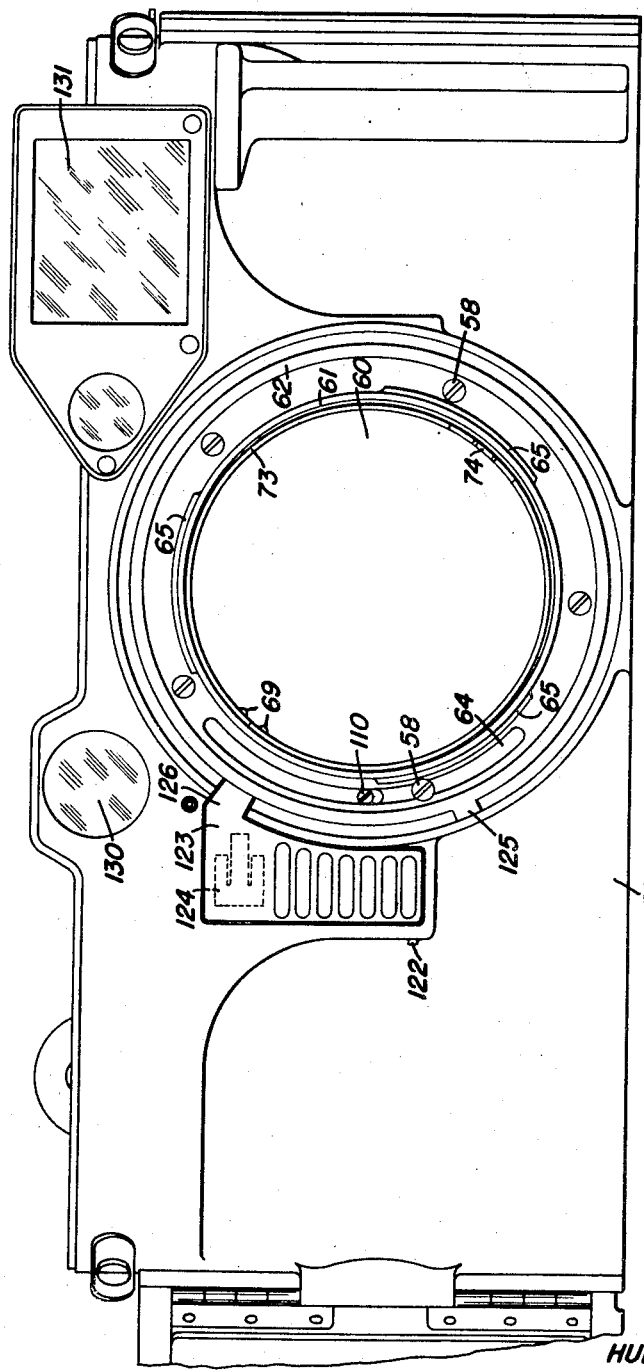

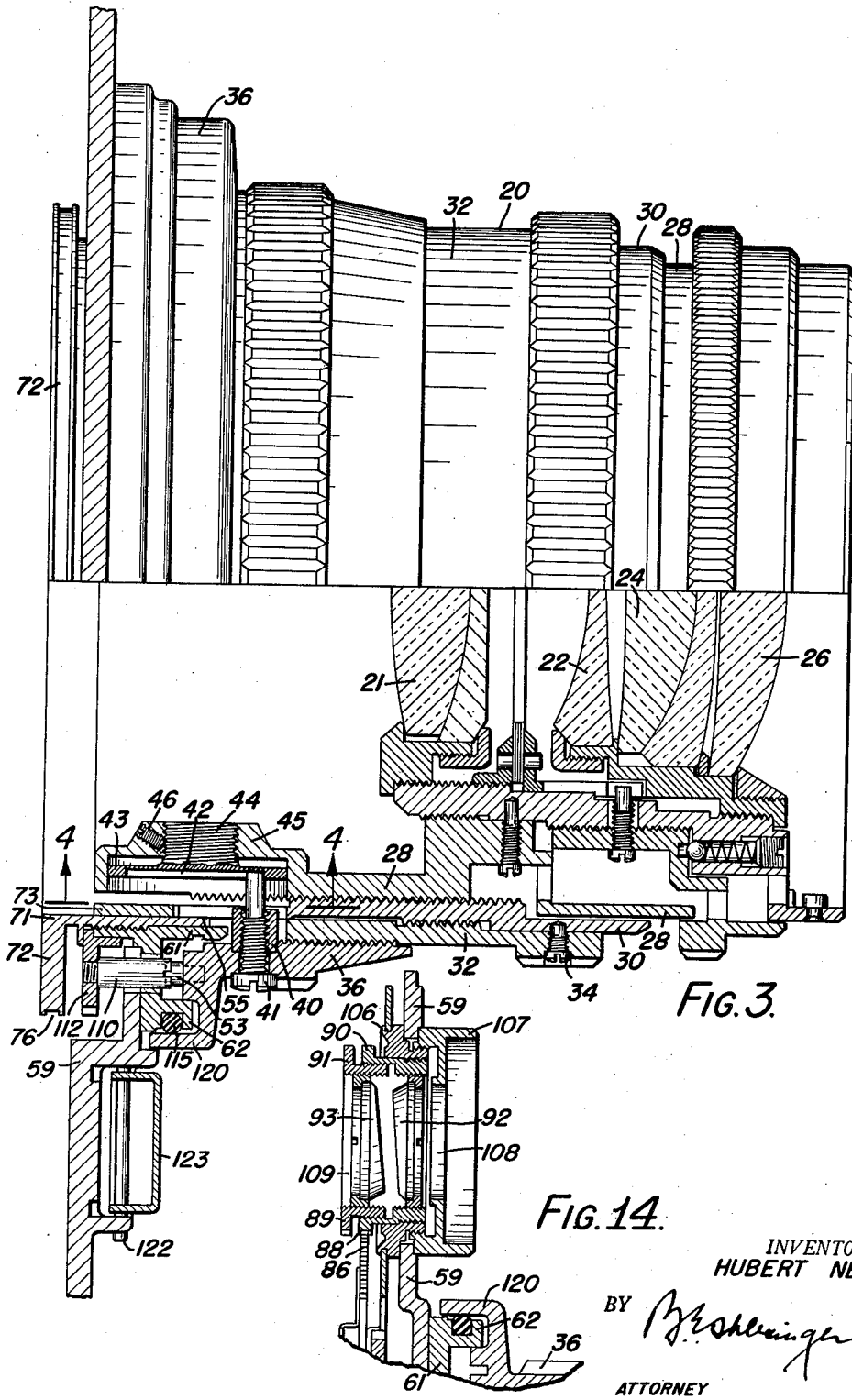

INVENTOR.
HUBERT NERWIN
BY
ATTORNEY

United States Patent Office

2,805,609
Patented Sept. 10, 1957

2,805,609
PHOTOGRAPHIC CAMERA AND OBJECTIVE MOUNTS THEREFOR

Hubert Nerwin, Irondequoit, N. Y., assignor to Graflex, Inc., Rochester, N. Y., a corporation of Delaware Application March 28, 1952, Serial No. 279,011

4 Claims. (Cl. 95—45)

The present invention relates to photographic cameras and particularly to a photographic camera which is adapted to be used with any one of a number of different, interchangeable photographic objective lenses. In a still more specific aspect, the invention relates to a photographic camera which is adapted to be used with any one of a number of different, interchangeable photographic objective lenses, and in which each objective lens, in use, is coupled with a base range finder that is secured to, or forms part of, the camera.

Cameras with coupled rangefinders are well known. If more than one objective lens is to be coupled to the rangefinder, however, the different characteristics of the focusing curves of the different objectives should be taken into consideration, and should be related to the means for operating the deflecting system of the rangefinder, if first-class performance is to be expected of the camera.

There are various types of deflecting systems used in camera rangefinders. Usually, though, the deflecting system comprises either a pair of axially-aligned rotary optical wedges, or a pivoted reflector. The deflecting system must, of course, be connected to the objective focusing mount to adjust as the objective is adjusted in focusing. Usually the connection is through gearing or by means of a cam.

Where the deflecting system is connected to the objective-focusing mount by gearing, compensation for the different characteristics of the focusing curves of different objectives has heretofore been so difficult as to be virtually impractical. Even when the deflecting system is operated by a rotary cam, different cams have heretofore been required for each different objective to be used with a camera. This renders the camera costly, and makes it bulky; it makes it difficult to interchange lenses in focusing mounts; and it complicates the camera and the focusing mounts as well.

The problem of coupling different lenses in focusing mounts to a rangefinder is complicated further by reason of the fact that it is impossible to make any lens or focusing mount absolutely accurate, and by reason of the fact that different lenses have different focal length tolerances.

One object of the present invention is to provide a camera on which different objective focusing mounts can be used, and having a rangefinder which can be coupled selectively to the different objective focusing mounts, in which the same means is employed, with all the objective focusing mounts, for adjusting the deflecting system of the rangefinder as the objective is adjusted in focusing.

Another object of the invention is to provide a camera on which different objective focusing mounts can be used, and having a coupled rangefinder, in which a single control cam may be employed for operating the deflecting system of the rangefinder regardless of which one of the several objective focusing mounts is used at any particular time.

Another object of the invention is to provide a camera in which different objective focusing mounts may be coupled with the rangefinder, and with which relatively simple means may be employed to compensate for the different characteristics of the focusing curves of the different objectives.

A further object of the invention is to provide a camera of the character described in which the compensating means may be built into the different objective focusing mounts, thereby simplifying the camera structure.

Another object of the invention is to provide a photographic objective focusing mount having means not only for compensating for the fact that the objective focusing mount is to be used in common with other objective focusing mounts for operating a coupled rangefinder but having means also for automatically compensating for the differences or tolerances in the focal length of each objective as the objective is adjusted rectilinearly in focusing.

Still another object of the invention is to provide adjustable means for compensating for focal length tolerances in a photographic objective, which means may be adjusted in the factory and fixed, and which means will automatically compensate for tolerances in that objective and its focusing mount even though that objective and its focusing mount be coupled to operating means for the deflecting system of a coupled rangefinder that is intended to be coupled, also, to other objective focusing mounts.

Other objects of the invention will be apparent hereinafter from the specification and from the recital of the appended claims.

In the drawings:

Fig. 1 is a front elevation of a camera constructed according to one embodiment of the present invention, the door at the rear of the camera being shown fragmentarily, also, and open;

Fig. 2 is a rear elevation of this camera with the door shown fragmentarily and open, and with parts of the camera broken away to show the deflecting mechanism of the rangefinder, the cam which operates the same, and other parts of the camera structure;

Fig. 3 is a part elevation, part axial section on an enlarged scale, showing an objective focusing mount constructed according to one embodiment of the present invention, and showing also parts of the camera, and how this objective focusing mount may be coupled to the cam which operates the deflecting mechanism of the rangefinder, part of this cam being shown in plan and part in axial section;

Fig. 4 is a section on the line 4—4 of Fig. 3 looking in the direction of the arrows;

Fig. 5 is a similar fragmentary section showing a modified form of guide plate for use in a different objective focusing mount;

Fig. 6 is a fragmentary side elevation of one of the objective focusing mounts on a reduced scale as compared with Fig. 3, and illustrating the means for limiting the locking movement of the objective focusing mount in coupling the mount to the camera;

Fig. 14 is a fragmentary section showing details of the deflecting system of the rangefinder.

Figure 7:
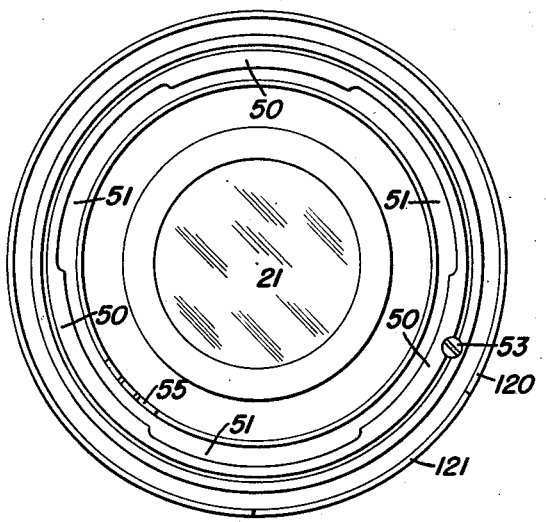
Fig. 7 is a rear view of the objective focusing mount further illustrating the locking and coupling means.
Figure 9:
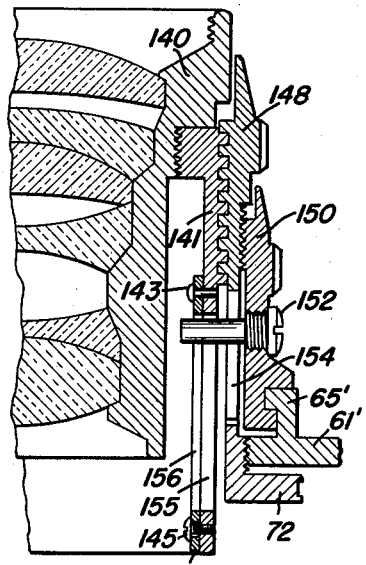
Fig. 9 is a fragmentary axial section of a photographic objective focusing mount made according to a further embodiment of the invention and showing a different means for compensating the focal length tolerances.

Any objective focusing mount used with a camera constructed according to the present invention may be of standard construction so far as the lens system of the objective focusing mount in concerned. In the objective focusing mount 20 shown in Fig. 3, for instance, the rear cemented doublet 21, the double concave lens 22, the cemented doublet 24, and the front concavo-convex lens 26 may form parts of a wide angle lens mount of conventional design and may be secured in the mount in conventional manner. Since this structure forms no part of the present invention it will not here be specifically described. Suffice it to say that the lens system of the objective is carried in a barrel 28 that is mounted in a sleeve 30 which threads externally on the barrel 28 and threads internally into a sleeve 32. Sleeve 32 is provided for adjustment of the objective focusing mount in the factory. It is fixedly secured to the sleeve 30, after such adjustment, by a set-screw 34. The front end of the sleeve 30 may in conventional manner be beveled off and graduated to read against an index mark or graduation on the periphery of the barrel 28. Threaded on the sleeve 32, but fixedly secured thereto, is the adjusting sleeve 36.

In the objective shown in Fig. 3, there is a fixed nut 40 mounted in the sleeve 36 and extending through a slot in the sleeve 30. A pin 41 threads into this nut. The inner end of this pin is adapted to engage in a slot 42 formed in a headed member 43. This member has an integral stem portion 44 that threads into a socket extension 45 carried by the barrel 28. A set-screw 46, that threads into the socket extension 45, is adapted to engage the threaded shank 44 of the member 43 to secure this member in any adjusted position.

All of the objective focusing mounts usable with a camera made according to the present invention are coupled to the camera casing in the same way, and all are connected to the cam that controls the deflecting system of the rangefinder in the same way. Each objective focusing mount is coupled to the camera casing by a bayonet lock. Each objective focusing mount is connected to the control cam by a lug or dog on the objective focusing mount which engages drivingly with the rotary control cam. The manner of coupling an objective focusing mount to the camera will be described specifically with reference to the mount shown in Fig. 3.

The sleeve member 36 is formed with three equi-angularly spaced lugs 50 (Fig. 7) that project radially inwardly. These are separated from one another by the three recesses 51. The alternate lugs and recesses 50, 51 form one part of the bayonet lock joint coupling whereby the objective focusing mount may be removably secured to the camera casing.

The front 59 of the camera casing has a circular opening 60 (Fig. 1) therein. Surrounding this opening is a collar 61. This collar is secured to the camera casing by screws 58. It has a peripheral flange or rib 62. Rotatably mounted in the collar 61 and threaded into it is the sleeve portion 71 of the control cam 72 (Fig. 3). The sleeve portion 71 has riveted to it at its inside, as denoted at 69 (Fig. 1), a spring ring 73 (Fig. 8) which is provided at a point diametrically opposite the rivets with a recess 74 (Figs. 1 and 8).

Figure 8:
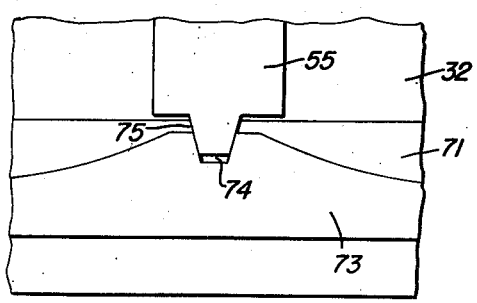
Fig. 8 is a fragmentary view looking at the inside of the barrel of the objective focusing mount and of the cam which controls the deflecting mechanism, and showing the means for coupling the objective focusing mount to the cam.

Formed integral with the sleeve 30 and projecting rearwardly therefrom is a dog or lug 55 (Figs. 3 and 8). The recess 74 of ring 73 is adapted to receive the finger 75 of the dog or lug 55 so as to couple the sleeve 30 of the objective focusing mount to the control cam.

Integral with the collar 61 are three equi-angularly spaced lugs 65. These form the other part of the bayonet lock by which an objective focusing mount may be coupled to the camera.

The cam 72 is formed with a peripheral cam track 76 (Figs. 2 and 3) in which engages the end 77 (Fig. 2) of the lever 78 that is pivoted at 79 in the camera and that is adapted to operate the viewfinder frames of the camera as described more particularly in my copending application Serial No. 288,511, filed May 17, 1952, now Patent No. 2,719,454.

The control cam 72 also operates the deflecting system of the rangefinder of the camera through a pair of levers 80 and 81 which are adjustably connected by studs 82 and 83, respectively, with levers 84 and 85, respectively. These levers are pivotally mounted in the camera on pins 84' and 85', respectively. They have toothed segments 86 and 87, respectively, integral therewith. The toothed segments 86 and 87 engage segmental gears 88 and 89 (Figs. 2 and 14), respectively, that are formed integral with rings 90 and 91, respectively, which are rotatable on one another and which carry the two axially-aligned, circular optical wedges 92 and 93 of the deflecting system of the rangefinder.

The wedge mounts thread into the rings 90 and 91, respectively. Ring 91 threads into ring 90 (Fig. 14); and ring 90 threads into an annulus 106. An annulus 107 threads onto annulus 106. The front face of the annulus 106 is adapted to abut against the rear face of the front wall 59 of the camera. The rear face of annulus 107 is adapted to abut against the front face of the front wall 59 of the camera; and annulus 107 can be threaded on annulus 106 to tighten them both against opposite faces of said wall 59. Annulus 107 is provided with a central window or opening 108 aligned axially with wedges 92 and 93. Likewise, ring 91 is provided with a central window or opening 109 which aligns axially with wedges 92 and 93 and window or opening 108. Thus an image of the subject to be photographed will pass through the wedges 92 and 93.

Coil springs 94 and 95 serve to take up back-lash in the gearing and to hold the levers 80 and 81 in engagement with cam 72. These springs engage at one end, respectively, with lugs 96 and 97, respectively, that are integral with the respective lens carrying rings 90 and 91. At their other ends, the two springs engage, respectively, lugs 98 and 99 that are fixed in the camera.

The levers 80 and 81 are adjustable on the arms 84 and 85, respectively, for a purpose more fully described in my copending application Serial No. 291,441, filed June 3, 1952. To this end, the levers are slotted as denoted at 100 and 101 (Fig. 2), respectively, and have downturned ends 102 and 103, respectively, that engage in slots 104 and 105, respectively, formed in the arms 84 and 85.

A stop 70 is secured in the casing to limit the rotary movement of cam 72 by engagement with a stop surface on the cam.

Mounted in the rear face of the objective sleeve 36 to project rearwardly therefrom is a pin 53 (Figs. 3 and 7). The pin 53 in each different objective focusing mount, except for one (preferably the one for the shortest focal length lens), is located at a different angular position about the axis of the objective focusing mount.

The pin 53 of each objective focusing mount is adapted to engage a pin 110 (Fig. 3) which is secured to a gear 112 that is rotatably mounted upon the collar 61. The pins 53 and 110 extend through an arcuate slot 64 (Fig. 1) in the collar 61 to engage one another (Fig. 3). The gear 112 is a segmental gear and has a cam surface 114 (Fig. 2) around part of its periphery which is adapted to be engaged by a hook shaped follower 116 that operates the parailax frames of the viewfinder of the camera as described more fully in my pending application Serial No. 288,511, filed May 17, 1952. These parallax frames are denoted at 118 and 118' in Fig. 2.

The pins 53 are arranged in different angular positions around the axes of the different objective focusing mounts so that when rotating the different objective focusing mounts to couple them by means of the bayonet lock connection to the camera housing, they will be rotated different amounts before their respective pins 53 engage pin 110. Hence, in coupling different objective focusing mounts, as, for instance, wide angle, normal angle, and telescopic focusing mounts, to the camera the gear 112 and its cam surface 114 will be rotated not at all, for the wide angle focusing mount, for instance, and different amounts, respectively, for the other focusing mounts, thereby shifting the parallax frames different amounts in accordance with the different objective focusing mounts used. This will position the parallax frames in front of the eyepiece of the view finder in accordance with the objective which is mounted on the camera, as described more fully in application Serial No. 288,511, above mentioned.

The sleeve 36 of each objective focusing mount has a skirt portion 120 (Fig. 6) which has an arcuate slot 121 therein. Pivotally mounted by means of a pin 122 in a recess in the front wall 59 of the camera casing is a detent 123 (Figs. 1 and 3). This detent is pressed forwardly by a leaf spring 124 which is interposed between the detent and the front face of the casing. When an objective focusing mount is being coupled to the camera by the bayonet lock connection, the skirt 120 of the objective focusing mount rides over the finger 126 of the detent depressing the detent. The objective can be rotated in the bayonet slot connection until one of the bounding walls of the slot 121 (Fig. 6) comes into engagement with a stop lug 125 (Fig. 1) that is integral with the peripheral rib 62 of collar 61. Immediately after the skirt 120 has passed over finger 126 of the spring detent 123, the finger snaps back into position to lock the objective focusing mount against rotation in one direction, while the stop lug 125 locks it against rotation in the other direction. The bayonet lock holds it to the camera casing.

To remove the objective focusing mount from the camera housing spring finger 123 is depressed and the objective focusing mount is rotated to align the lugs 50 with the spaces between the lugs 65 of the camera casing. Then the objective mount is withdrawn axially.

The windows through which an object may be viewed in the rangefinder are denoted at 130 and 131, respectively. Window 130 is circular, and registers with optical wedges 92 and 93. Window 131 is rectangular, and registers with the viewfinder.

As previously stated if more than one objective focusing mount has to be coupled with a range finder on a camera, care has to be taken of the different characteristics of the focusing curves of the different lenses in relation to the cam which operates the deflecting system of the range finder. To enable different lens focusing mounts to be used with a single control cam, each lens focusing mount, except one, has to have a compensation curve. One lens focusing mount can be made without a compensation curve if the control cam for the deflecting system of the range-finder is made to suit the focusing characteristic of that lens. The compensation curve can be placed, as a guide slot, in the normally sliding part of the lens focusing mount. It is advisable to design the control cam in accordance with the focusing characteristic of the shortest focal length lens to be used with this camera, because then the guide slot for this lens focusing mount can be made straight. It is easier to make the slot curved in shape when the focusing movement is larger as is the case with objectives of longer focal length.

Focal length tolerances should be compensated for, in addition to compensating for the different characteristics of the different focal length lenses. More than one guide slot would be necessary in each mount if different focal length tolerances, which range from minus one percent to plus one percent, are to be compensated for. The number of slots at different inclinations would depend upon how much of a deviation in accuracy may be ignored. It is obvious that the milling operations on the lens focusing mounts would be quite expensive for each slot would have to be milled separately. All this is avoided in the lens focusing mounts of the present invention. Here, as shown in Figs. 4 and 5, for instance, angularly adjustable guide plates are employed. Each plate 43, 43' has a slot 42, 42', respectively, in it that is made in accordance with the focusing characteristic of the objective with which it is used, each plate forming part of a focusing mount. The plate 43, which has a straight slot, is used, for instance, in a wide angle lens focusing mount. The plate 43', which has a curved slot 42' in it, might be used in either a normal angle lens focusing mount or a telescopic lens focusing mount. The curvature of the slot 42' for the normal angle lens focusing mount differs, however, from the curvature of the slot 42' for the telescopic lens focusing mount due to the different focusing characteristics of these lenses.

Each guide plate 43 or 43' is rotatably adjustable in its focusing mount by loosening set screw 46 and rotating the plate to rotate stud 44 (Fig. 3) in the extension 45 of barrel 28, thereby to incline the guide slot 42 or 42' to axis of the objective focusing mount. Since the number of angular positions of slots 42 or 42' are infinite, it will be seen that by angular adjustment of the plate 43 or 43' in its particular focusing mount the tolerances in each objective and errors in its focusing mount can be compensated for.

The guiding slot or curve 42, 42' in each plate should be shaved to obtain a smooth surface for the guiding pin 41.

Use of guide plates has three major advantages. The cost of production is as low as it possibly can be and the guide plate can be individually adjusted for each focal length tolerance and locked in proper position. By employing differently slotted guide plates in different objective focusing mounts, all those mounts can be coupled to the same rangefinder control cam.

Since the part 36, which carries the pin 41, is held against rotation when the objective focusing mount is secured to the camera, when the ring 32 is rotated to adjust the barrel 28 for focusing the camera, an additional or subtractive movement will be imparted to the lens barrel 28 depending on the direction of inclination of the slot 42, 42' to the axis of the lens barrel and the shape of the slot.

The plates 43, 43' are adjusted angularly and fixed in the objective focusing mounts in the factory after the lenses have been tested, and it has been determined how much angular adjustment, if any, is required to compensate for the focal length tolerances of each lens or error of each focusing mount.

If the plate 43 with its straight slot 42 is positioned so that slot 42 extends in the direction of the axis of the objective focusing mount, there is no additional motion imparted to barrel 28 by slot 42, but if the plate 43 is adjusted angularly about the axis of stud 44 to incline the straight guide way 42 with reference to the direction of the axis of the objective, then as the focusing ring 32 is rotated an additional algebraic motion will be imparted to the barrel 28 which is additive or subtractive, depending on the direction of inclination of the slot, and which will compensate for the tolerances in the objective lens.

When an objective focusing mount, such as a normal angle or a telescopic focusing mount is focused, there will always be an algebraic motion imparted to barrel 28 by pin 41 and slot 42' over and above that caused by focusing ring 32. This motion will be in part additive and in part subtractive because slot 42' is curved. The amount of the motion will depend on the shape of slot 42' and on its inclination to the axis of the objective focusing mount. The curvature of the slot itself compensates for use of the normal angle or telescopic objective focusing mount with a cam 72 that is designed for use with a wide angle lens focusing mount. The angle at which the slot is inclined to the axis of the mount compensates for the focal length tolerances of the lens and errors in the focusing mount itself.

Further embodiments of objective focusing mounts made according to the invention are shown in Figs. 9 to 13. Here the objective comprises a plurality of lenses mounted in conventional manner in a holder 140 which has an externally threaded barrel 141 secured to it. In the case of the mount for a wide angle lens there may be secured inside of the barrel 141 an angularly adjustable plate 142. This plate is adapted to pivotally adjust about a pin 143 and is secured in any adjusted position by a screw 145. The screw 145 passes through an arcuate slot 146 in the plate concentric of the pin 143. Rotatably mounted upon the barrel 141 is a focusing sleeve or ring 148 which threads thereon and to which there is threadedly secured a second sleeve 150. The second sleeve 150 is adapted to be engaged with the camera housing, to lock the objective focusing mount to the camera, through a bayonet lock connection similar to that previously described. In this case, however, the camera casing 61' has an annular flange 65' on it that surrounds the sleeve 150 of each focusing mount.

Sleeve 148 has a lug 154 integral with it, like lug 55 (Fig. 8) which engages ring 73 of cam 72. A pin 152 secured in the sleeve 150 passes alongside the lug 154 and protrudes through an opening 155 in barrel 141, engaging in a slot 156 in the plate 142 that is mounted on barrel 141.

Figures 10, 11, 12:
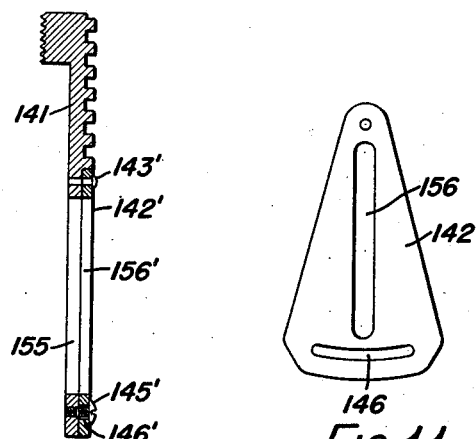
Fig. 10 is a fragmentary axial section showing part of the barrel of the objective and the tolerance compensating control plate.
Fig. 11 is a side elevation of a control plate such as may be used in a wide angle lens constructed according to Fig. 9 or Fig. 10.
Fig. 12 is a side elevation of a modified form of control plate such as may be used with a lens of a different focal length.
Figure 13:
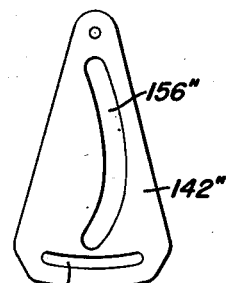
Fig. 13 is a bottom plan view of either of the plates shown in Figs. 11 and 12.

As before, the slot 156 will be made straight in the case of the objective for which control cam 72 is designed. As before, then, for a wide angle lens the slot 156 will preferably be made straight. For normal angle and telescopic lenses slots with different curves will be employed. Fig. 12 shows a plate 142'' such as may be employed in a normal angle lens focusing mount. Here the plate is provided with a slot 156'' which is curved to compensate for the focusing characteristic of the normal angle lens. A slot of somewhat different curvature would be employed in a telescopic lens focusing mount. Slot 146'' is to receive screw 145.

As before the slots 156, 156'' permit of using a single cam for objective lenses of different focal lengths, whereas the tiltable adjustment of the plates 142 and 142'' permit of compensating for the tolerances in focal lengths of the specific objectives. As before, when the objective focusing mount is adjusted in focusing, the shape of the slot in plate 142 or 142'' and the position of the plate will determine the additional or subtractive movement imparted to the barrel 141 of the objective focusing mount. As before the lens barrel is connected to the cam 72 by a dog 55 (Fig. 8) so that as the sleeve 30 rotates the control cam 72 rotates with it to impart movement to the optical wedges 92, 93 of the deflecting system of the rangefinder and to impart movement to the frames of the viewfinder.

A further embodiment of the invention is illustrated in Fig. 10. Here the guide plate is donated at 142'. It is similar in construction to guide plate 142. It is secured to the outside of the barrel 141 of the objective focusing mount, however, instead of being secured to the inside of the barrel as are the plates 142 and 142'' of Figs. 9 and 12. Otherwise plate 142' is used in the same general way as are plates 142 and 142''. It has a slot 156'; that is straight or curved in accordance with the focusing mount with which it is used; and it pivots adjustably about a pin 143' whose axis extends at right angles to the axis of the barrel; and plate 142' is secured in any adjusted position by a screw 145' which passes through arcuate slot 146' in plate 142' and threads into barrel 141. Slot 146' is concentric with pivot 143'.

While the invention has been described in connection with several different embodiments thereof, it will be understood that it is capable of further modification. This application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A photographic objective focusing mount comprising a ring member which is adapted to be secured to a camera in stationary position, a manually rotatable sleeve threaded into said ring member, an axially movable lens-carrying barrel threaded into said sleeve, means for holding said barrel against rotation, whereby said barrel is moved axially upon rotation of said sleeve, said ring member, sleeve and barrel being coaxial, a guide member and a pin, one of the two last-named parts being secured to said ring member, and the other of said two last-named parts being secured to said barrel inside said ring member, said pin extending radially of the axis of said barrel, said guide member having a guide surface along which said pin travels as said barrel moves axially, and said guide member being angularly adjustable about an axis radial of the axis of said barrel to incline its guide surface at an angle to the axis of said barrel, whereby the axial movement of said barrel is controlled by said guide surface when said sleeve is rotated, and means for securing said guide member in any adjusted position.

2. A photographic objective focusing mount according to claim 1 in which said guide member is mounted in said barrel and has a peripheral surface which is a surface of revolution coaxial with the axis about which said guide member is adjustable, said barrel has a socket formed therein to receive said guide member, which has a complementary surface of revolution fitting about the periphery of said guide member, said guide member has a guide slot extending generally diametrally relative to the axis about which said guide member is adjustable, and which provides the guide surface of said guide member, and said pin is secured to said ring member to project inwardly radially of the axis of said ring member and to engage in said slot.

3. A photographic objective focusing mount according to claim 1 in which said guide member has a longitudinally curved slot therein that provides said guide surface, and in which said pin engages in said slot.

4. A photographic objective focusing mount according to claim 1 in which said guide member has a cylindrical peripheral surface and is mounted in a socket in said barrel which has a corresponding cylindrical surface surrounding the peripheral surface of said guide member, said guide member being adjustable about the common axis of said cylindrical surfaces, said guide member having a guide slot in its outer end face which extends across said face and which provides its guide surface, and said pin being secured to said ring member to project inwardly thereof and to engage in said slot.

References Cited in the file of this patent

UNITED STATES PATENTS

| | | |
|---|---|---|
| 1,835,503 | Lemke | Dec. 8, 1931 |
| 1,973,213 | Kuppenbender et al. | Sept. 11, 1934 |
| 2,124,161 | Cooke et al. | July 19, 1938 |
| 2,164,695 | Brinck et al. | July 4, 1939 |
| 2,172,338 | Mihalyi | Sept. 5, 1939 |
| 2,193,038 | Mihalyi | Mar. 12, 1940 |
| 2,193,459 | Kuppenbender | Mar. 12, 1940 |
| 2,279,476 | Mihalyi | Apr. 14, 1942 |
| 2,313,567 | Mihalyi | Mar. 9, 1943 |
| 2,401,134 | Brethauer | May 28, 1946 |

FOREIGN PATENTS

| | | |
|---|---|---|
| 853,295 | France | Nov. 28, 1939 |